US009582867B2

(12) United States Patent
Suhr et al.

(10) Patent No.: US 9,582,867 B2
(45) Date of Patent: Feb. 28, 2017

(54) DRIVING ASSISTANT APPARATUS OF VEHICLE AND OPERATING METHOD THEREOF

(71) Applicants: HYUNDAI MOBIS Co., Ltd., Yongin-si, Gyeonggi-do (KR); Industry-University Cooperation Foundation Hanyang University, Seoul (KR)

(72) Inventors: Jae Kyu Suhr, Incheon (KR); Ho Gi Jung, Seoul (KR)

(73) Assignees: HYUNDAI MOBIS CO., LTD., Yongin-si, Gyeonggi-do (KR); INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 238 days.

(21) Appl. No.: 14/513,287

(22) Filed: Oct. 14, 2014

(65) Prior Publication Data
US 2016/0014394 A1 Jan. 14, 2016

(30) Foreign Application Priority Data

Jul. 9, 2014 (KR) ........................ 10-2014-0086231

(51) Int. Cl.
*H04N 13/00* (2006.01)
*G06T 5/10* (2006.01)
(Continued)

(52) U.S. Cl.
CPC ............... *G06T 5/10* (2013.01); *G06T 7/0075* (2013.01); *H04N 13/0239* (2013.01);
(Continued)

(58) Field of Classification Search
CPC ................... H04N 2013/0081; H04N 13/0271; G06T 2207/30256; G06T 2207/20061; G06T 2207/10012; G06T 2200/04; G06T 7/0075; G06T 5/10
See application file for complete search history.

(56) References Cited

U.S. PATENT DOCUMENTS 5,983,147 A * 11/1999 Krumm .............. G06K 9/00362
280/735
7,620,202 B2 * 11/2009 Fujimura ........... G06K 9/00201
348/169
(Continued)

FOREIGN PATENT DOCUMENTS

JP 2011-117842 A 6/2011

OTHER PUBLICATIONS

Jae Kyu Suhr, Ho Gi Jung, "Piece-wise Linear Function-based Road Surface Estimation Using Dense Stereo Vision", The Korea Society of Automotive Engineers, Nov. 2012, p. 1414-1418.
(Continued)

*Primary Examiner* — Sath V Perungavoor
*Assistant Examiner* — Puneet Dhillon
(74) *Attorney, Agent, or Firm* — Paratus Law Group, PLLC

(57) ABSTRACT

Disclosed is an apparatus for assisting driving, including: a stereo camera module mounted in a vehicle, and configured to obtain a first image through a first camera and a second image through a second camera; and a processor configured to stereo-match the first image and the second image to obtain a dense disparity map, estimate a cubic b-spline curved line from the dense disparity map by using a coarse-to-fine method, and perform a road profile for two-dimensionally converting a 3D road, on which the vehicle travels, by using the cubic b-spline curved line.

14 Claims, 10 Drawing Sheets

(51) Int. Cl.
*H04N 13/02* (2006.01)
*G06T 7/00* (2006.01)
*G06K 9/00* (2006.01)

(52) U.S. Cl.
CPC ............ *G06T 2207/10012* (2013.01); *G06T 2207/20016* (2013.01); *G06T 2207/20061* (2013.01); *G06T 2207/30256* (2013.01); *H04N 2013/0081* (2013.01)

(56) References Cited

U.S. PATENT DOCUMENTS

| | | | | |
|---|---|---|---|---|
| 2004/0105074 A1* | 6/2004 | Soliz | ............ | G06T 7/0012 351/206 |
| 2008/0205791 A1* | 8/2008 | Ideses | ............ | H04N 19/597 382/285 |
| 2010/0014722 A1* | 1/2010 | Rohrer | ............ | G06K 9/6207 382/128 |
| 2010/0082248 A1* | 4/2010 | Dorum | ............ | G01C 21/32 701/533 |
| 2011/0176722 A1* | 7/2011 | Sizintsev | ............ | G06T 7/0022 382/154 |
| 2012/0078867 A1* | 3/2012 | Dorum | ............ | G01C 21/32 707/705 |
| 2012/0105582 A1* | 5/2012 | Youn | ............ | G06T 3/4069 348/43 |
| 2013/0129148 A1* | 5/2013 | Nanri | ............ | G01C 21/3602 382/103 |
| 2014/0086477 A1* | 3/2014 | You | ............ | B60W 40/06 382/154 |
| 2014/0114534 A1* | 4/2014 | Zhang | ............ | B60R 1/00 701/42 |
| 2015/0031352 A1* | 1/2015 | Yi | ............ | G01C 21/206 455/420 |

OTHER PUBLICATIONS

Andreas Wedel et al, B-Spline Modelng of Road Surfaces With an Appication to Free-Space Estimation. IEEE Trans. on Int. Transportation Systems. Dec., 2009, vol. 10, No. 4.

* cited by examiner (a)  (b)

DRIVING ASSISTANT APPARATUS OF VEHICLE AND OPERATING METHOD THEREOF

CROSS-REFERENCE TO RELATED APPLICATIONS

The present application claims priority to Korean Patent Application Number 10-2014-0086231 filed Jul. 9, 2014, the entire contents of which the application is incorporated herein for all purposes by this reference.

TECHNICAL FIELD

The present invention relates to a driving assistant device for a vehicle, and an operating method thereof.

BACKGROUND

In general, a vehicle is a transportation means for generating power through an engine thereof, transmitting the generated power to wheels, and transporting passengers or goods on a road. The vehicle may be generally divided into a body forming an exterior appearance, and a chassis in which various devices are organically connected. The chassis includes an engine of the vehicle, which generates driving force for driving, and main devices, such as a power transmission device, a steering device, a suspension device, and a brake device.

In the meantime, research on a stereo camera as a device for convenience of a vehicle has recently been actively conducted. The stereo camera simultaneously provides an image and distance information, so that the stereo camera has been widely researched for the purpose of recognizing a front driving environment.

SUMMARY

The present invention has been made in an effort to provide a driving assistant device for estimating a road surface based on a dense stereo vision using a coarse-to-fine method, and an operating method thereof.

Objects of the present invention are not limited to the objects described above, and other objects that are not described will be clearly understood by a person skilled in the art from the description below.

An exemplary embodiment of the present invention provides an apparatus for assisting driving, including: a stereo camera module mounted in a vehicle, and configured to obtain a first image through a first camera and a second image through a second camera; and a processor configured to stereo-match the first image and the second image to obtain a dense disparity map, estimate a cubic b-spline curved line from the dense disparity map by using a coarse-to-fine method, and perform a road profile for two-dimensionally converting a 3D road, on which the vehicle travels, by using the cubic b-spline curved line.

Another exemplary embodiment of the present invention provides a method of operating an apparatus for assisting driving including a stereo camera module, which obtains a first image through a first camera and a second image through a second camera, the method including: stereo-matching the first image and the second image to obtain a dense disparity map; estimating a cubic b-spline curved line from the dense disparity map by using a coarse-to-fine method; and performing a road profile for two-dimensionally converting a 3D road, on which the vehicle travels, by using the cubic b-spline curved line.

Specific items of other exemplary embodiments are included in the detailed description and the drawings.

According to the exemplary embodiment of the present invention, there are one or more effects as follows.

First, it is possible to properly estimate a road surface regardless of a shape of the road surface or a traffic condition, thereby improving performance of estimating the road surface.

Second, it is possible to promote safe driving and improvement of convenience for a driver.

Third, it is possible to apply the present invention to a vehicle without adding a separate process or a component, thereby achieving lightness of the vehicle.

The effects of the present invention are not limited to the aforementioned effects, and other effects, which are not mentioned above, will be clearly understood by those skilled in the art from the claims.

The effects of the present invention are not limited to the effects described above, and a person of ordinary skill in the art will clearly understand other effects that are not described from the description of the scope of the claims.

DETAILED DESCRIPTION

Figure 1:
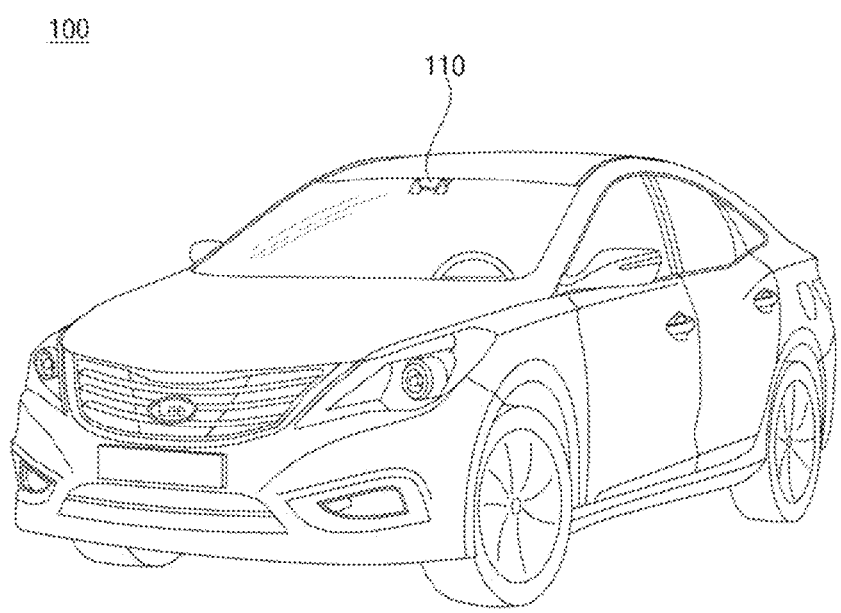
FIG. 1 is a diagram schematically illustrating a vehicle including a driving assistant device according to an exemplary embodiment of the present invention.

Various advantages and features of the present invention and methods accomplishing thereof will become apparent from the following detailed description of exemplary embodiments with reference to the accompanying drawings. However, the present invention is not limited to the exemplary embodiments set forth below, and may be embodied in various other forms. The present exemplary embodiments are for rendering the description of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

In the following detailed description, names of constituents, which are in the same relationship, are divided into "the first", "the second", and the like, but the present invention is not necessarily limited to the order in the following description.

FIG. 1 is a diagram schematically illustrating a vehicle including a driving assistant device according to an exemplary embodiment of the present invention.

Referring to FIG. 1, a driving assistant device 100 according to the exemplary embodiment of the present invention includes a stereo camera module 110.

The stereo camera module 110 is mounted in a vehicle. The stereo camera module 110 may have a structure detachable to a ceiling or a front glass of the vehicle.

The stereo camera module 110 includes a first camera and a second camera. The stereo camera module 110 obtains a first image through the first camera, and obtains a second image through the second camera.

Figure 2:
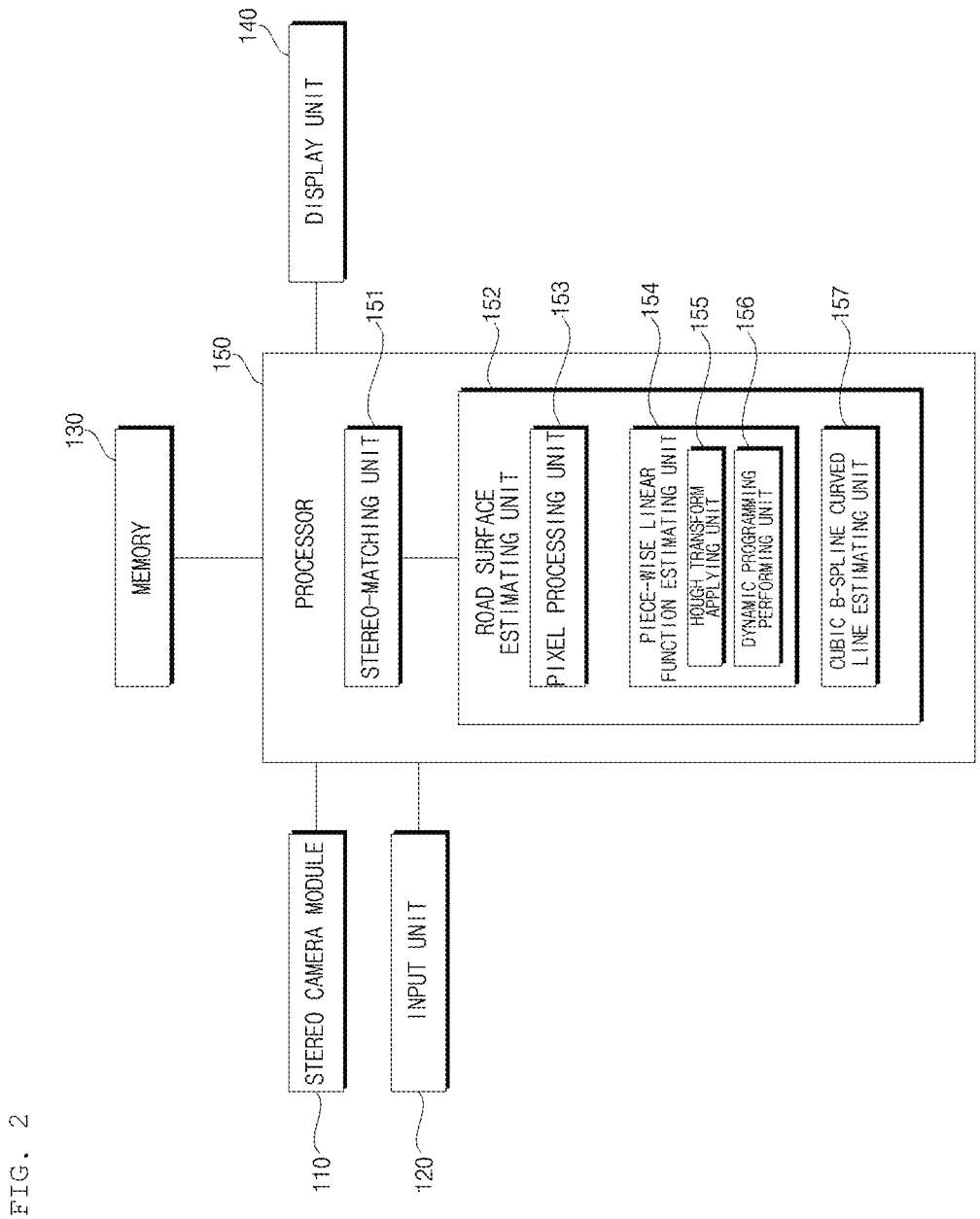
FIG. 2 is a block diagram illustrating the driving assistant device according to the exemplary embodiment of the present invention.

FIG. 2 is a block diagram illustrating the driving assistant device according to the exemplary embodiment of the present invention.

Referring to FIG. 2, the driving assistant device 100 according to the exemplary embodiment of the present invention includes the stereo camera module 110, an input unit 120, a memory 130, a display unit 140, and a processor 150.

The stereo camera module 110 has been described with reference to FIG. 1.

The input unit 120 may include a plurality of buttons or a touch screen attached to the driving assistant device 100 for the vehicle, particularly, the stereo camera module 110. The driving assistant device 100 for the vehicle may be operated by turning on power of the driving assistant device 100 for the vehicle through the plurality of buttons or the touch screen. In addition, various input operations may be performed through the plurality of buttons or the touch screen.

The memory 130 may store various data, such as a program for processing or controlling by the processor 150, for a general operation of the driving assistant device 100.

The display unit 140 may display an image related to the operation of the driving assistant device 100. In order to display the image, the display unit 100 may include a cluster or a head up display (HUD) on a front surface inside the vehicle. In the meantime, when the display unit 140 is the HUD, the display unit 140 may include a projective module for projecting an image on the front glass of the vehicle. In the meantime, the display unit 140 may be an audio video navigation (AVN) module.

The processor 150 stereo-matches the first image and the second image received from the stereo camera module 110, and obtains a dense disparity map. The processor 150 estimates a cubic b-spline curved line from the dense disparity map by using a coarse-to-fine method. The processor 150 performs a road profile for converting a 3D road, on which the vehicle travels, to a 2D road by using the cubic b-spline curved line.

The processor 150 estimates a shape of a road surface. In general, since an obstacle is defined and recognized as an object existing on the road surface, a road surface estimating result directly influences obstacle detecting performance. Accordingly, it is very important to accurately estimate the road surface. The road surface is actually a 3D curved surface, but is approximated to a 2D slice and estimated considering accuracy, robustness, and the amount of calculation. The road surface expressed by the 2D slice may be referred to as a road profile.

The processor 150 may estimate the road profile by modeling the road profile to the piece-wise linear function, or modeling the road profile to the b-spline curved line. The driving assistant device 100 may estimate the road profile by modelling the road profile to the cubic b-spline curved line. The reason is that since the cubic b-spline curved line has a high degree of freedom, the cubic b-spline curved line is advantageous in accuracy and flexibility.

Depending on an exemplary embodiment, the processor 150 may estimate the road profile modeled to the cubic b-spline curved line by using the Kalman filter. In this case, when 3D points input into the Kalman filter are points including Gaussian noise extracted from the road surface, the Kalman filter is properly operated, but when points extracted from an obstacle or a stereo-matching error are included in the 3D points, the Kalman filter is difficult to be properly operated.

In order to overcome the limit, the processor 150 may estimate the road profile by using a region of interest based outlier removing method. For example, 1) a method of setting a predicted driving corridor based on movement sensor information, 2) a method of using an experimentally selected region of interest in the form of a second-order polynomial function, 3) a method of using an expected variance calculated based on a triangulation error, and 4) a method of setting a region of interest based on a predicted height and a cumulative variance of the road profile may be used. The methods have an effect of decreasing a b-spline curved line estimation error by removing an outlier included in the 3D points, but it is very difficult to remove most of the outliers and maintain most of the inliers with the experimentally set region of interest in various road surface situations. Further, for a remote distance road surface, an error of a predicted driving corridor and a triangulation error become considerably large, so that it is very difficult to use the method.

In order to overcome the limit of the outlier removing method, the processor 150 may estimate the road profile by using a robust estimator based method. The robust estimator based method continuously performs least-squares estimation by gradually increasing a region of a road surface involving in the estimation of the road surface, thereby estimating the road surface to be robust to the outlier. The robust estimator based method may also be named as an M-estimator based method using an experimentally set binary weighting function. The M-estimator based method may secure robustness to the small number of outliers, but has a limit in that the road profile may be included in a local optimum in the situation where there are adjacent obstacles to generate the large number of outliers. Further, in the situation where the plurality of outliers is included, there is a high possibility in that the experimentally set binary weighting function selects wrong 3D points.

In the exemplary embodiment according to the present invention, in order to overcome the limit of the existing methods, the road profile is estimated based on the cubic b-spline curved line which is described below. In this case, since it is not easy to directly estimate a function having the high degree of freedom in the situation where there is the plurality of outliers, the driving assistant device 100 may use the coarse-to-fine method.

The coarse-to-fine method may include three stages. In the first stage, a road surface is divided into a plurality of sections, Hough Transform is applied to 3D points existing in each section, and a voting result is obtained. In the second stage, dynamic programming is performed by setting the voting result as a data term, and a connection relationship between straight lines of each section and a change in an inclination of the straight lines of each section as a smoothness term, thereby estimating a piece-wise linear function. In the last stage, points on the estimated piece-wise linear function are uniformly sampled and the cubic b-spline curved line is estimated based on the sampled points, thereby obtaining a final road profile.

According to the exemplary embodiment of the present invention, the following effects may be obtained.

1) It is possible to stably estimate the cubic b-spline curved line by using only the appropriate amount of calculation by using the coarse-to-fine method in the situation where noise variously exists.

2) It is possible to robustly estimate an optimum parameter of the piece-wise linear function by using both the Hough Transform and the dynamic programming in the situation where the plurality of outliers exists.

The processor 150 may include a stereo-matching unit 151 and a road surface estimating unit 152.

The stereo-matching unit 151 stereo-matches the first image and the second image received from the stereo camera module, and obtains a dense disparity map.

The road surface estimating unit 152 estimates a cubic b-spline curved line from the dense disparity map obtained by the stereo-matching unit 151 by using the coarse-to-fine method.

The road surface estimating unit 152 includes a pixel processing unit 153, a piece-wise linear function estimating unit 154, and a cubic b-spline curved line estimating unit 157.

The pixel processing unit 153 three-dimensionally restores all of the pixels of the dense disparity map, and accumulates the three-dimensionally restored pixels on an YZ plane. The pixel processing unit 153 divides the pixels according to a distance. For example, the pixel processing unit 153 divides the pixels, which are accumulated on the YZ plane for each predetermined section of a distance of a road included in the dense disparity map.

The piece-wise linear function estimating unit 154 receives a result of the accumulation from the pixel processing unit 153, and estimates the piece-wise linear function from the result of the accumulation.

In the meantime, the piece-wise linear function estimating unit 154 includes a Hough Transform applying unit and a dynamic programming performing unit.

The Hough Transform applying unit applies Hough Transform to the 3D points existing in the result of the accumulation, and obtains a voting result.

The dynamic programming performing unit sets the voting result as data term by receiving the voting result from the Hough Transform applying unit, and sets a connection relationship between straight lines of each section and a change in an inclination of the straight lines of each section as a smoothness term, and performs dynamic programming and estimate a piece-wise linear function.

The cubic b-spline curved line estimating unit 157 receives the estimated piece-wise linear function from the piece-wise linear function estimating unit 154, and estimates the cubic b-spline curved line based on the estimated piece-wise linear function.

Figure 3:
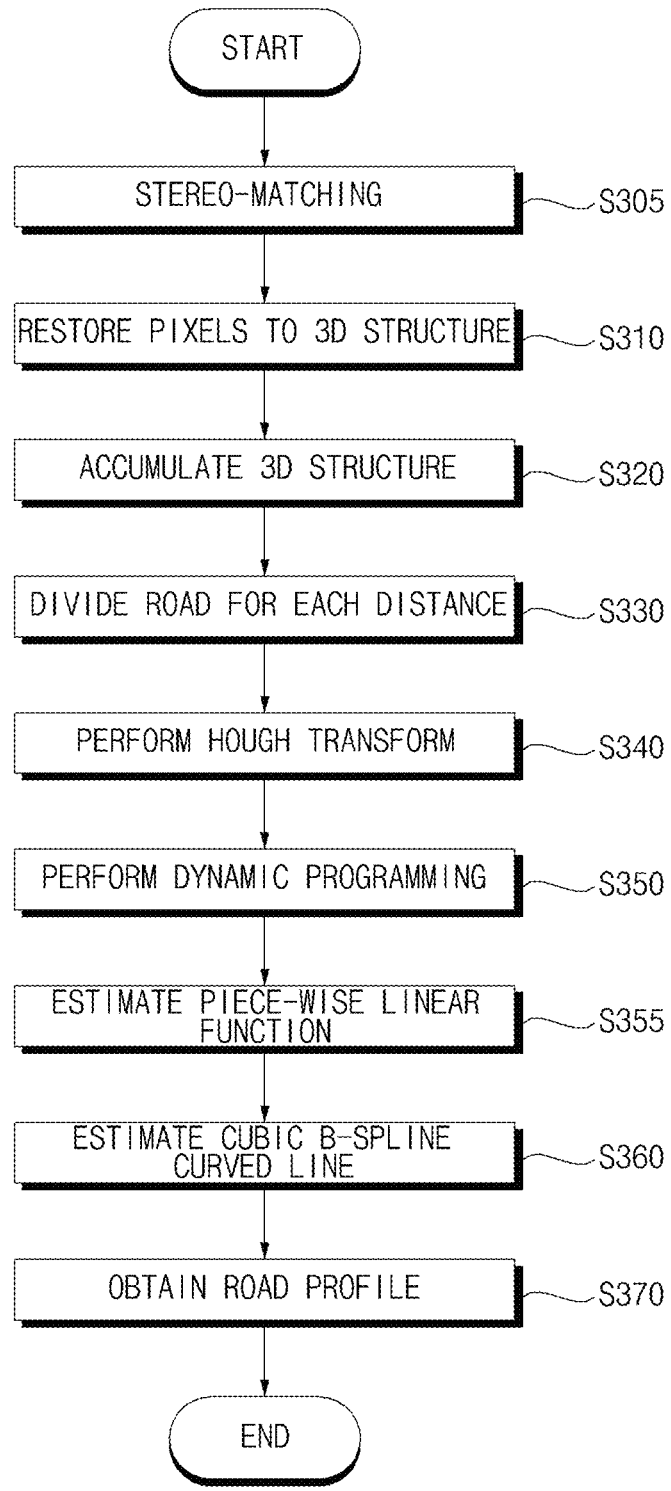
FIG. 3 is a diagram referred for describing an operating method of the driving assistance device according to the exemplary embodiment of the present invention.

FIG. 3 is a diagram referred to describing an operating method of the driving assistance device according to the exemplary embodiment of the present invention.

Referring to FIG. 3, the stereo-matching unit 151 stereo-matches the first image and the second image to obtain a dense disparity map (S305).

Then, the pixel processing unit 153 three-dimensionally restores all of the pixels of the dense disparity map (S310), and accumulates the three-dimensionally restored pixels on an YZ plane (S320).

Next, the pixel processing unit 153 divides a road for each distance in the dense disparity map (S330).

Then, the Hough Transform applying unit 155 applies Hough Transform to the 3D points existing in a result of the accumulation, and obtains a voting result (S340).

Next, the dynamic programming performing unit 156 sets the voting result as a data term, and sets a connection relationship between straight lines of each section and a change in an inclination of the straight lines of each section as a smoothness term, and performs perform dynamic programming (S350) and estimates a piece-wise linear function (S355).

Next, the cubic b-spline curved line estimating unit 157 estimates the cubic b-spline curved line based on the estimated piece-wise linear function (S360), and obtains a road profile (S370).

Figure 4:
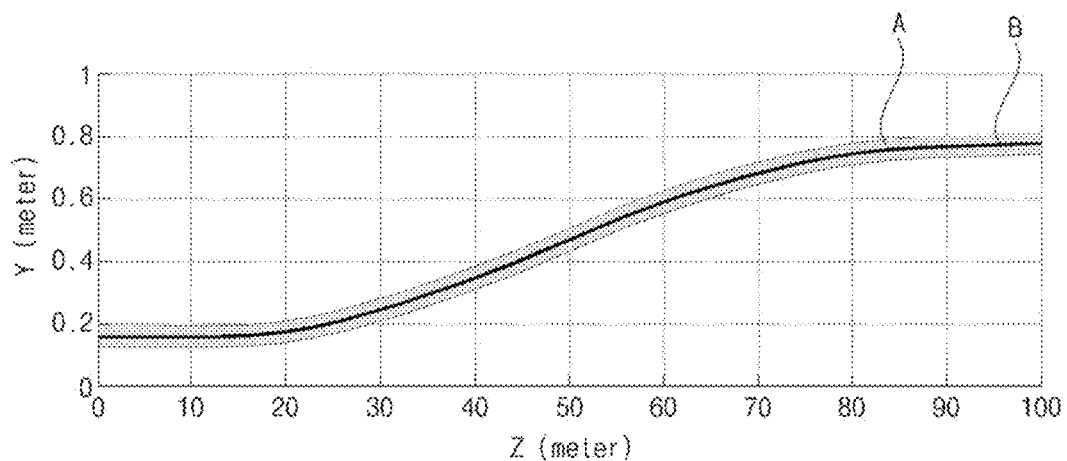
FIG. 4 is a diagram referred for describing an approximation result of modeling a road surface by using a coarse-to-fine method according to the exemplary embodiment of the present invention.

FIG. 4 is a diagram referred for describing an approximation result of modeling a road surface by using the coarse-to-fine method according to the exemplary embodiment of the present invention.

Referring to FIG. 4, it is difficult to directly estimate the cubic b-spline curved line having a high degree of freedom and a nonlinear property from actual data in which both a random error and a gross error exist.

The processor 150 estimates the piece-wise linear function, and then estimates a road surface by using the coarse-to-fine method of estimating the cubic b-spline curved line based on a result of the estimation. For example, the pixel processing unit 153 models the road surface having the section of 100 m to the cubic b-spline curved line having a control point for each section of 20 m, and approximates the modeled road surface to 20 linear functions set at an interval of 5 m. FIG. 4 illustrates a result of the approximation. In FIG. 4, a curved line A means the cubic b-spline curved line, and a curved line B means the result of approximating the cubic b-spline curved line to the piece-wise linear function. It can be seen from FIG. 4 that the cubic b-spline curved line may be comparatively accurately approximated to the piece-wise linear function.

The approximation has advantages described below. First, robustness to a random error (for example, a zero-mean Gaussian noise) is secured. The least-squares estimator, which is the basis of the robust estimator, such as a RANSAC and the M-estimator, generally finds a solution for minimizing a squared sum of an algebraic error for efficiency of the calculation. Since a proportional relationship between an algebraic error and a geometric error is formed for a linear model expressed by a first polynomial expression, an influence of the random error may be removed. However, in the situation, such as a high-order polynomial expression, where nonlinearity of the model is increased, a fitting error is unintentionally weighted to cause a wrong result, such as bias of the estimated parameter. Further, when the voting based method, such as Hough Transform, is applied, as the degree of freedom of the model is increased, the number of voting bins is sharply increased compared to the number of elements of data, and as a result, the data, to which the random error is added, is not sufficiently accumulated in a proper bin, thereby causing an error in estimating a parameter by peak detection. Accordingly, the estimation of the piece-wise linear function having the linear property is more robust to the random error compared to the cubic b-spline curved line having high nonlinearity.

Second, robustness to the gross outlier is secured. The direct estimation of the function having the high degree of function in the situation where the plurality of outliers exists requires a large amount of calculation. In the situation of FIG. 4, in order to estimate the cubic b-spline curved line by using the Hough Transform, $N^8$ voting bins need to be handled. However, when it is assumed that respective linear functions configuring the piece-wise linear function are independent, it is enough to handle only $20 \cdot N^2$ voting bins. N means the number of voting bins of each parameter space. Further, when the estimation is performed by using the RANSAC, the former one requires repeated performance of $\log(1-p)/\log(1-w^8)$, but the latter one requires only repeated performance of $20 \cdot \log(1-p)/\log(1-w^2)$. p and w mean a probability in which at least one random sample is configured by only an inlier, and a proportion of the inlier. When complexity is less, the amount of calculation is less, and a possibility in an accurate estimation increases.

The piece-wise linear function expressing the actual road surface is continuous, so that dependency exists among the linear functions, but in this stage, in order to secure robustness to the outlier, it is assumed that the linear functions configuring the piece-wise linear function are independent. Instead, the dependency is set as the smoothness term of the dynamic programming to be restored in the parameter estimation stage. Contents thereof will be described in detail below.

Figure 5A:
FIGS. 5A to 5C are diagrams referred for describing an operation of a dense pixel processing unit according to the exemplary embodiment of the present invention.
Figure 5B:
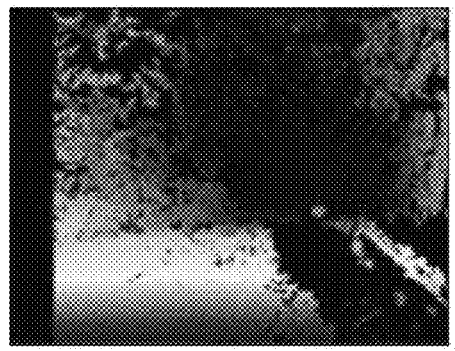
Figure 5C:
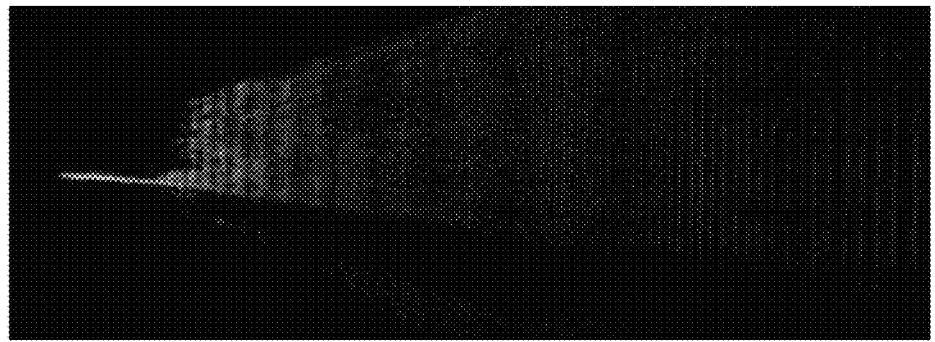

FIGS. 5A to 5C are diagrams referred for describing an operation of a dense pixel processing unit according to the exemplary embodiment of the present invention.

Referring to FIGS. 5A to 5C, the processor 150 estimates a road surface by using the dense disparity map. FIG. 5A illustrates an image obtained by the first camera, FIG. 5B illustrates the dense disparity map, and FIG. 5C illustrates a 3D point accumulation result.

The dense disparity map is a result calculated by a semi-global matching (SGM) method implemented in an OpenCV. The pixel processing unit 153 three-dimensionally restores all of the pixels of the dense disparity map, and then accumulates the three-dimensionally restored pixels on the YZ plane. In this case, the great number of 3D points may be expressed only with the small number of bins, thereby improving efficiency in estimating the road surface. In FIG. 5C, accumulation result brightness is illustrated by a logarithmic scale. A horizontal axis of the drawing means that the z-axis is 0 m to 100 m, and a vertical axis means that the Y axis is −10 m to +10 m. A camera is located at (0 m, 0 m), and a size of bin is set to 0.1 m×0.1 m. The pixel processing unit 153 performs tilt compensation on the 3D points, and then accumulates the tilt compensated points.

In the image, a short-distance object is displayed to be large, and a long-distance object is displayed to be small by perspective projection, which causes imbalance between the results of the long-distance accumulation and the short-distance accumulation. The pixel processing unit 153 normalizes the accumulation value according to a distance as expressed by Equation 1 in order to prevent the imbalance.

$$\overline{A}(j, i) = \frac{A(j, i)Z(i)}{f} \quad \text{[Equation 1]}$$

A(j, i) and $\overline{A}$(j, i) mean an original accumulation result and a normalized accumulation result, respectively, and Z(i) and f mean a distance and a focal distance in the pixel unit corresponding to A(j, i), respectively, and i and j mean an index of the horizontal axis and the vertical axis of the accumulation result, respectively. Original points of i and j are a left-upper end of FIG. 5C.

FIGS. 6A to 6D are diagrams referred for describing an operation of a piece-wise linear function estimating unit and a cubic b-spline curved line estimating unit according to the exemplary embodiment of the present invention.

The most representative method of estimating a road surface by using the piece-wise linear function is a method of selecting a combination of straight lines, which have large accumulation values and have an envelope form, in the Hough Transform result of the v-disparity. However, since the method cannot express a road surface in which inflection is generated two or more times, and uses the v-disparity, the method has a disadvantage in that resolution is sharply decreased according to the distance. A method of estimating the piece-wise linear function divided into small sections by using the RANSAC has a limitation in that a front side of the linear function of a specific section is only influenced, so that the method has a disadvantage in that an error incurred in the front side of the linear function is propagated to a rear side.

The piece-wise linear function estimating unit 154 uses the Hough Transform and the dynamic programming in order to accurately and robustly estimate the piece-wise linear function. The piece-wise linear function estimating unit 154 includes a Hough Transform applying unit 155 and a dynamic programming performing unit 156.

In this case, since the Hough Transform provides goodness of fit for the combination of all of the parameters within a search range in a road surface of each section through the accumulation value, the Hough Transform can be effectively used as a data term of the dynamic programming demanding an evaluation for the combination of all of the parameters. Further, the dynamic programming may independently apply the Hough Transform to a section of each road surface to secure the continuity property between the linear functions of the adjacent sections, which failed to be obtained, by utilizing the smoothness term. Lastly, since the dynamic programming searches for a combination having the highest goodness of fit among the combinations of the straight lines existing in all of the sections, the dynamic programming may more stably estimate the piece-wise linear function, compared to the existing methods of sequentially performing the estimation from a short distance to a long distance.

The piece-wise linear function is expressed by Equation 2.

$$Y = \tan(\theta_n) \cdot Z + \rho_n, Z_{n-1} \leq Z < Z_n \quad \text{[Equation 2]}$$

In Equation 2, $Z_{n-1}$ to $Z_n$ means an $n^{th}$ section, and $\theta_n$ and $\rho_n$ mean an angle of a straight line existing in the $n^{th}$ section and a segment of the Y axis, respectively. In this case, $\rho_n$ is calculated based on a position at which each straight line is started. A cost function of the dynamic programming for estimating the piece-wise linear function is configured by Equation 3.

$$C(\theta_n, \rho_n, \theta_{n+1}, \rho_{n+1}) = D(\theta_n, \rho_n) + S(\theta_n, \rho_n, \theta_{n+1}, \rho_{n+1}) \quad \text{[Equation 3]}$$

In Equation 3, $D(\theta_n, \rho_n)$ and $S(\theta_n, \rho_n, \theta_{n+1}, \rho_{n+1})$ mean the data term and the smoothness term, respectively.

The data term is obtained by applying the Hough Transform to a result of the accumulation of each section. In this case, in order to prevent the points accumulated by the obstacle from hindering the estimation of the road surface, an operation of Equation 4 is performed before performing the Hough Transform.

$$\underline{A}(j,i) = \overline{A}(j,i) - \max\{\overline{A}(j+1,i), \overline{A}(j+2,i), \ldots, \overline{A}(j_{max},i)\} \quad \text{[Equation 4]}$$

Figure 6A:
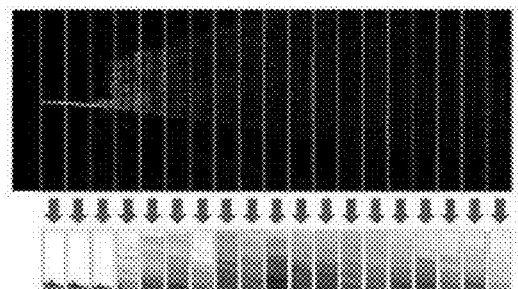
FIGS. 6A to 6D are diagrams referred for describing an operation of a piece-wise linear function estimating unit and a cubic b-spline curved line estimating unit according to the exemplary embodiment of the present invention.
Figure 6B:
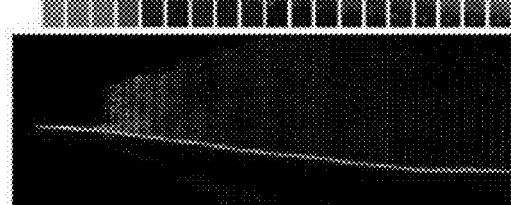

In Equation 4, $j_{max}$ means a maximum value of index j. This is a calculation of subtracting a maximum value of the results of the accumulation existing in a lower place than a corresponding place from a result of the accumulation at a specific position, and has an effect of reducing the accumulation value generated from the obstacle existing on the road surface. After performing the calculation, the road surface is divided into 20 sections, and the Hough Transform is applied to of each section. A range and an interval of $\theta_n$ and $\underline{A}(j, i)$ used during the Hough Transform are set as described below. $\theta_n$ is set to divide an interval from −4.0° to +4.0° by each 1.0°. $p_n$ is set to divide an interval from −5.0 m to +5.0 m by each 0.1 m. FIGS. 6A and 6B illustrate divided sections of the road surface, and a result of the Hough Transform generated at each section, respectively. $\theta_n$ and $p_n$ indicate a horizontal axis and a vertical axis of the result of the Hough Transform, respectively. Since a section from the camera to 5.0 m deviates a view angle of the stereo camera, the section is excluded when the road surface is estimated, and thus, only the 19 results of the Hough Transform are presented in the drawing. The result of the Hough Transform is used as the data term of the dynamic programming as expressed by Equation 5.

$$D(\theta_n, \rho_n) = H(\theta_n, \rho_n) \quad \text{[Equation 5]}$$

In Equation 5, $H(\theta_n, \rho_n)$ means a value corresponding to position $(\theta_n, \rho_n)$ of the voting result obtained by applying the Hough Transform to the value of $\underline{A}(j, i)$ in the $n^{th}$ section. A minus sign is added so that the dynamic programming solves the minimization problem. The smoothness term is configured by two terms reflecting two characteristics of the piece-wise linear function as expressed by Equation 6.

$$S(\theta_n, \rho_n, \theta_{n+1}, \rho_{n+1}) = S_1(\theta_n, \rho_n, \theta_{n+1}, \rho_{n+1}) + S_2(\theta_n, \theta_{n+1}) \quad \text{[Equation 6]}$$

The first term of Equation 6 is set by Equation 7 by reflecting the characteristic that the linear functions existing in the adjacent section need to meet at a boundary of the sections.

$$S_1(\theta_n, \rho_n, \theta_{n+1}, \rho_{n+1}) = \begin{cases} 0, & \text{if } R(\theta_n, \rho_n, \theta_{n+1}, \rho_{n+1}) \leq T \\ \infty, & \text{otherwise} \end{cases} \quad \text{[Equation 7]}$$

In Equation 7, $R(\theta_n, \rho_n, \theta_{n+1}, \rho_{n+1})$ means a distance in the Y-axis direction between the two linear functions at the boundary position of the sections of the road surface, and is expressed by Equation 8.

$$R(\theta_n, \rho_n, \theta_{n+1}, \rho_{n+1}) = |\{\tan(\theta_n) \cdot Z_n + \rho_n\} - \{\tan(\theta_{n+1}) \cdot Z_n + \rho_{n+1}\}| \quad \text{[Equation 8]}$$

When the distance is smaller or equal to a predetermined threshold value T, the first term is 0, and otherwise, the first term is infinite. Accordingly, the term compels the strict condition that the linear functions existing in the adjacent sections need to meet at the boundary of the two sections. The value of T is set to the same value as the size (0.1 m) of the bin used in the process so as to handle with a quantization error generated when the 3D points are accumulated. The second term of Equation 6 is set by Equation 9 by reflecting the characteristic that inclinations of the linear functions of the adjacent sections need to be smoothly changed.

$$S(\theta_n, \theta_{n+1}) = |\{Z_{n+1} - Z_n\} \cdot \tan(\theta_n)\} - \{Z_{n+1} - Z_n\} \cdot \tan(\theta_{n+1})\}| \quad \text{[Equation 9]}$$

Figure 6C:
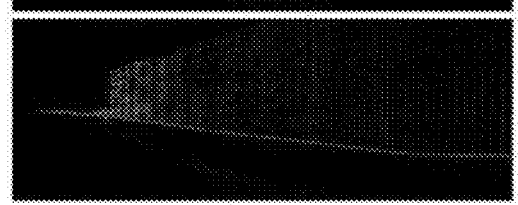

Equation 9 expresses the change in the inclinations of the linear functions existing in the adjacent sections, which is changed to a change quantity in the Y-axis direction. The dynamic programming performing unit 156 performs calculation by setting both the data term of Equation 5 and the smoothness term of Equation 6 to have the same value in the metric unit, in order to make the costs of the dynamic programming be balanced. FIGS. 6B and 6C illustrate the results of estimating the piece-wise linear function according to the exemplary embodiment of the present invention. A position indicated by a red cross on the result of the Hough Transform of FIG. 6B means a parameter of the linear function estimated in the corresponding section, and a green line of FIG. 6C means a result of the estimation of estimating the road profile expressed by the piece-wise linear function.

Figure 6D:
Figure 7:
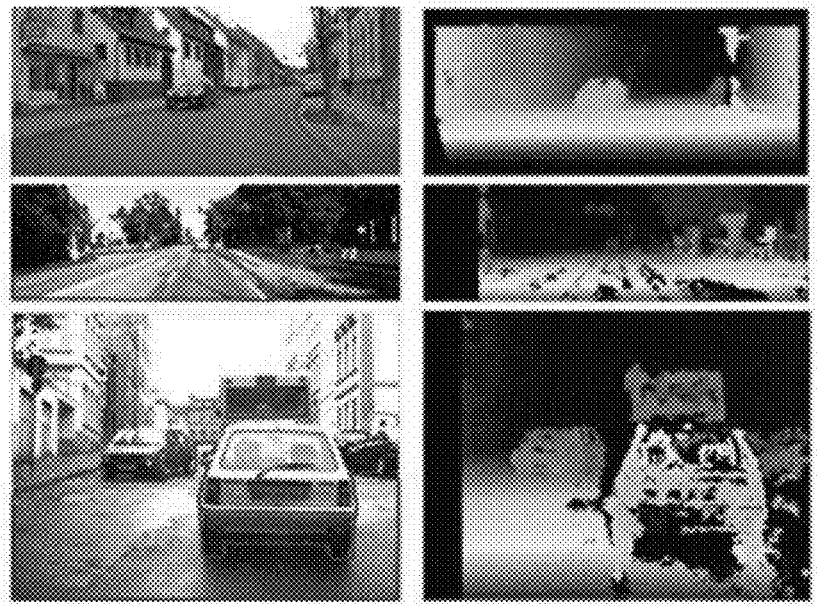
FIGS. 7 to 12 are diagrams referred for describing a result of a comparative experiment for obtaining a road profile according to the present invention.

The estimated piece-wise linear function has a disadvantage in that the inclination at the boundary of the sections is sharply changed. Accordingly, the cubic b-spline curved line estimating unit 157 according to the present invention estimates the cubic b-spline curved line based on a result of the initial estimation, thereby correcting a result of estimating the road surface. To this end, the points on the estimated piece-wise linear function are uniformly sampled, and the least-squares estimation method is applied to the sampled points to estimate the cubic b-spline curved line. A red line of FIG. 6D illustrates the finally estimated cubic b-spline curved line.

FIGS. 7 to 12 are diagrams referred for describing a result of a comparative experiment for obtaining a road profile according to the present invention.

A. Description of a DB Used in an Experiment

In the method according to the exemplary embodiment of the present invention, the obtainment of the profile was quantitatively evaluated based on three kinds of common DB. The used common DBs are a 6D-Vision scene labeling database (6D-Vision DB) [19], a KITTI vision benchmark suit-road database (KITTI DB), and a Daimler stereo pedestrian detection benchmark data set (DAIMLER DB). The 6D-Vision DB and the KITTI DB are used for providing information, in which a road region is indicated, and the DAIMLER DB is used because the DAIMLER DB includes various downtown situations. The 6D-Vision DB and the KITTI DB are configured by 500 images and 287 images, respectively. Since the DAIMLER DB does not separately provide the information about the region of the road surface, the information about the road surface is directly input into uniformly selected 306 images to be used. The 6D-Vision DB uses the provided dense disparity map, and the dense disparity map is not provided to the KITTI DB and the DAIMLER DB, so that the KITTI DB and the DAIMLER DB obtain the dense disparity map by the SGM method implemented in the OpenCV to use the obtained dense disparity map. Table 1 represents detailed descriptions of the used DBs.

TABLE 1

| DB | Number of ground truth | Stereo-matching algorithm | Image resolution (pixels) |
|---|---|---|---|
| 6D-Vision DB | 500 | SGM implemented in Daimler | 1024 × 440 |
| KITTI DB | 287 | SGM implemented in OpenCV | 1242 × 375 (slightly different) |
| DAIMLER DB | 306 | SGM implemented in OpenCV | 640 × 480 |

B. Evaluation and Comparison of Performance

In the present experiment, performance was evaluated and compared by comparing ground truth of the road profile based on a manually obtained cubic b-spline curved line, and a result of estimating the road profile by the road surface estimating method. The ground truth of the road profile is obtained through the following process. 1) Disparity information about a manually input region of the road surface is selected. 2) A position, at which the stereo-matching is failed, is manually removed. 3) A 3D position of each pixel is restored by using the remaining disparity information. 4) Information about a maximum position, which is confirmable in the current image, is input. 5) The least-squares estimator is applied to the 3D points to the maximum position to estimate the cubic b-spline curved line. The obtained road profile may be considered as the most precise road profile obtainable from the given stereo-matching result and the cubic b-spline curved line model, so that the obtained road profile is used as the ground truth.

In order to evaluate the performance, average vertical difference (AVD) is used. When G and E mean a ground truth road profile and a lower end region of the road profile obtained by the estimation, respectively, the AVD is calculated as a value obtained by dividing a symmetric difference between G and E by a maximum distance L, as expressed by Equation 10.

$$AVD = \frac{G \Delta E}{L} = \frac{(G \cup E) - (G \cap E)}{L}$$ [Equation 10]

The AVD means a distance error in the vertical axis (Y-axis) of the result of estimating the road surface, so that it means that when a value of the AVD is small, an accurate result is output.

The exemplary embodiment of the present invention was compared with two existing methods using the robust estimator, which is robust to the outlier, to be evaluated. The first method is an M-estimator based region growing method (hereinafter, method A), and the second method is a RANSAC based sequential estimation method (hereinafter, method B). Table 2 represents a result of calculating the AVD by applying the three methods to three kinds of DB. It can be seen from Table 2 that the exemplary embodiment of the present invention exhibits more excellent performance than that of the existing two methods in all of the three kinds of DB. When all of the three DBs are combined, the suggested method shows the AVD of 9.6 cm, and method A and method B show the AVD of 20.3 cm and 19.5 cm, respectively. In method A, it can be seen that performance sharply deteriorates in the DAIMLER DB. The reason is that the 6D-Vision DB and the KITTI DB are mostly configured by situations where a front obstacle is not close, so that the region of the road surface is rarely hidden, as can be seen in the first and second rows of FIG. 6A, but the DAIMLER DB includes a plurality of situations where a vehicle is positioned at a short distance, so that the region of the road surface is considerably hidden, as can be seen in the third row of FIG. 6A. Accordingly, it can be seen that method A is sensitive to a road surface hidden situation, compared to the other two methods. Method B exhibits the worst performance in the 6D-Vision DB and the KITTI DB. The reason is that the performance of method B is dependent to a threshold value based sampling method sensitive to a stereo-matching error. Further, all of the three methods exhibit excellent performance in the 6D-Vision DB compared to the other DBs because, as can be seen in FIG. 6B, a quality of the dense disparity map included in the corresponding DB is more excellent than the result of the SGM provided by the OpenCV.

TABLE 2

| Database | Method A | Method B | Proposed method |
|---|---|---|---|
| 6D-Vision DB | 13.6 cm | 15.9 cm | 7.8 cm |
| KITTI DB | 18.3 cm | 24.1 cm | 11.1 cm |
| DAIMLER DB | 32.9 cm | 20.9 cm | 11.2 cm |
| Total | 20.3 cm | 19.5 cm | 9.6 cm |

Figure 8:
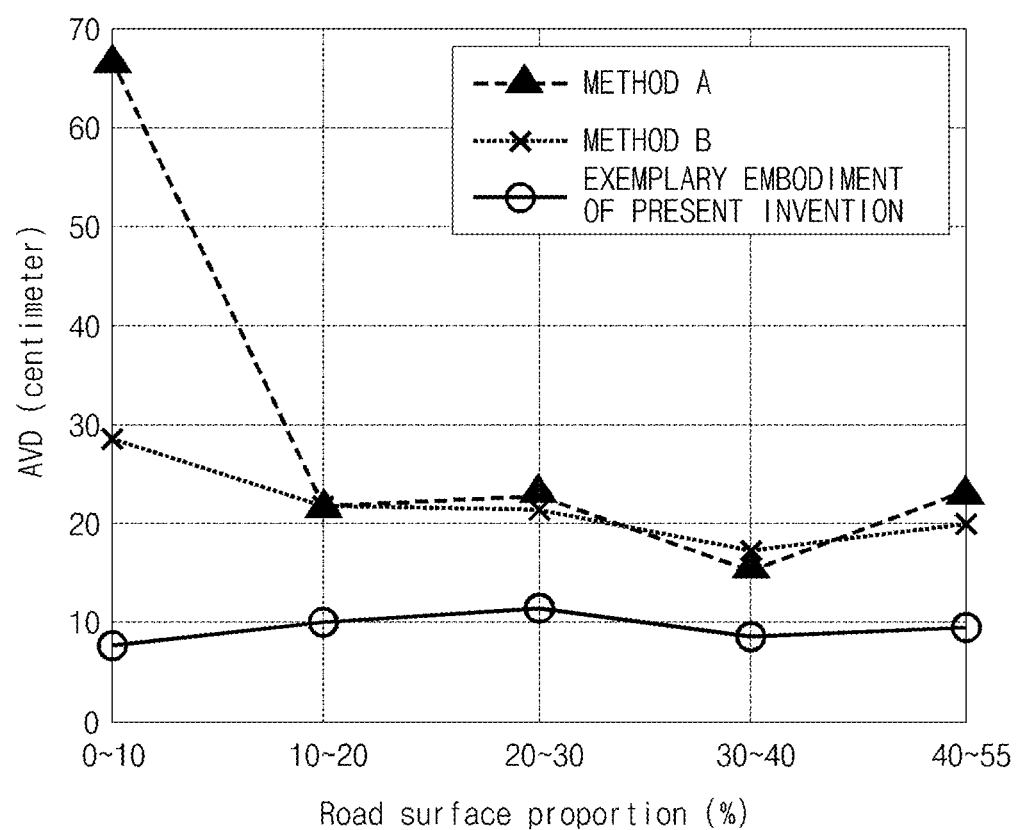

The reason that the exemplary embodiment of the present invention is more excellent than the existing methods may be described in two aspects. First, the suggested method is robust to the case where the region of the road surface is little shown (the case where a ratio of the outlier is high). FIG. 8 illustrates a change in a value of the AVD of the three methods according to a ratio of the region of the road surface. In FIG. 8, a horizontal axis means a ratio of a region of the road surface, and a vertical axis means a value of the AVD. The ratio of the region of the road surface means a ratio of an area of the manually input region of the road surface to an area of the entire image. It can be seen that the method suggested in FIG. 8 has an almost similar value of the AVD regardless of a ratio of the region of the road surface, but as a ratio of the region of the road surface is decreased, the value of the AVD is increased in the existing two methods. Particularly, it can be seen that in method A, as a ratio of the region of the road surface is decreased, the value of the AVD is very sharply increased. The reason is that the M-estimator used in method A is more sensitive to a ratio of a region of a non-road surface (a ratio of the outlier) than the Hough Transform used in the suggested method and the RANSAC used in method B.

Figure 9:
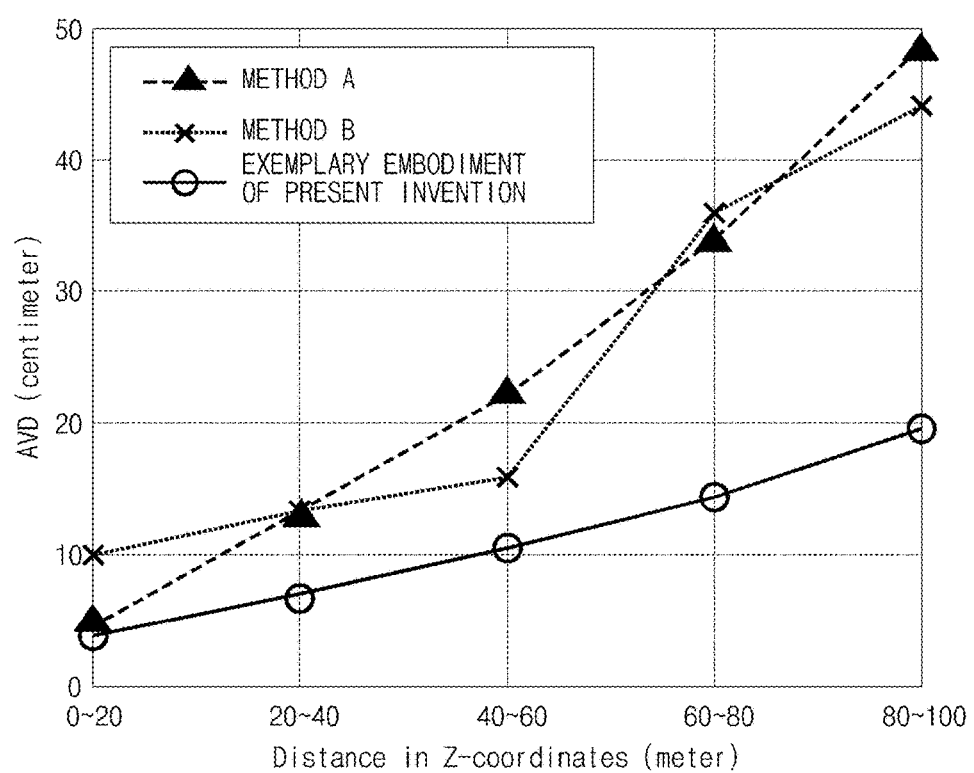

The second reason of excellent performance of the suggested method is that as a distance is increased, an error is smoothly increased. FIG. 9 illustrates a change in a value of the AVD of the three methods according to a distance. In FIG. 9, a horizontal axis means a z-axis distance, and a vertical axis means a value of the AVD. It can be seen in FIG. 9 that an error increase rate of the suggested method is much smoother than those of the two existing methods. The reason of the phenomenon may be analyzed in two aspects. First, while the road profile of each section is estimated by considering information about all of the sections through the dynamic programming in the suggested method, the road profile is estimated from a short distance to a long distance in the two existing methods, so that a road profile at a specific position is estimated while being dependent to only information about a front position of the corresponding position. Accordingly, in the existing methods, an error of the estimation of the road profile generated in a front section is continuously propagated, and as a distance is increased, an error of the estimation of the road surface is sharply increased. Second, as a distance is increased, the region of the road surface is decreased in the image by perspective distortion, and a ratio of a region of a non-road surface is increased. This means that a ratio of the outlier in a long distance section is very large than that in a short distance section. As analyzed through FIG. 8, since the suggested method is more robust to the outlier compared to the existing methods, the suggested method outputs a more excellent result at a long distance.

Figure 10:
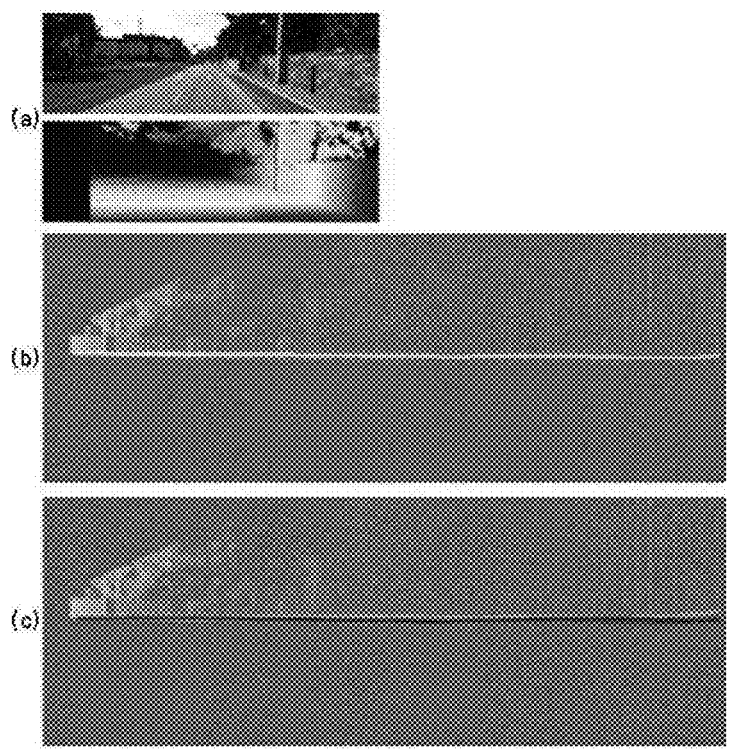
Figure 11:
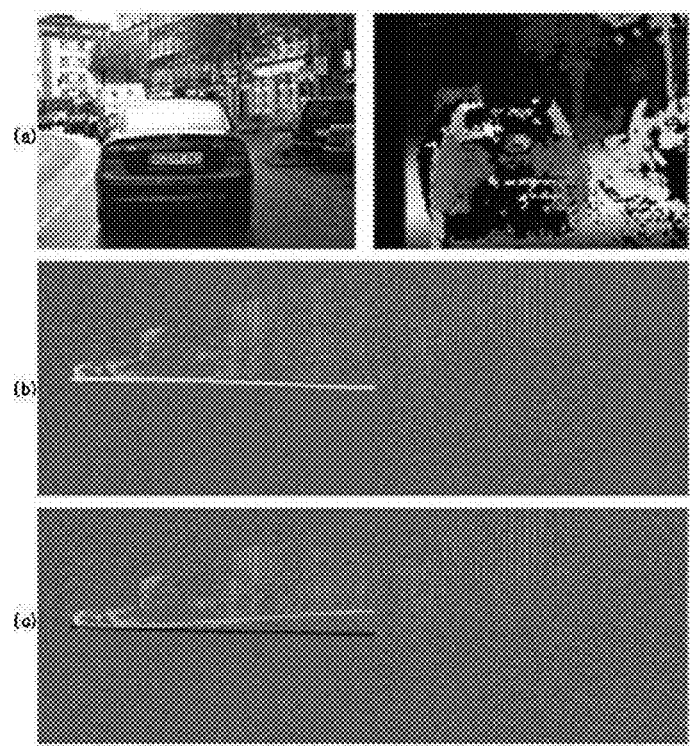
Figure 12:
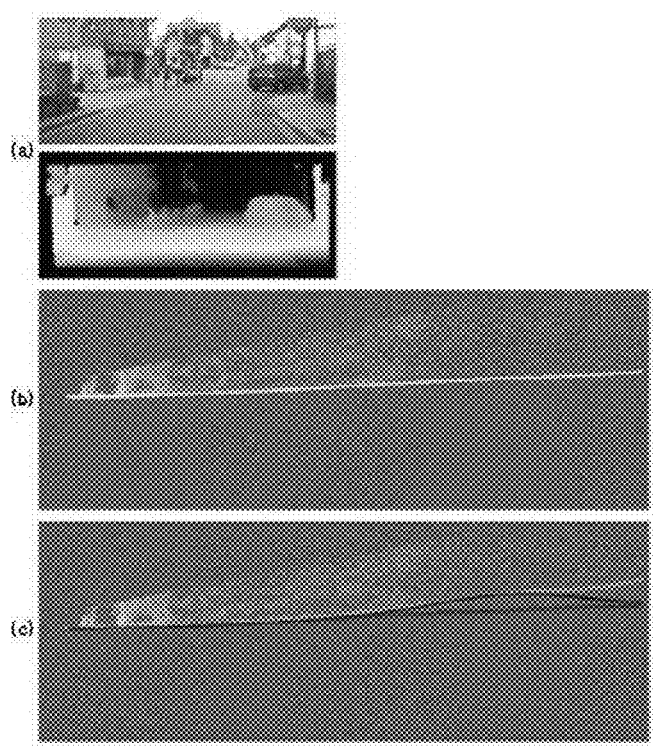

FIGS. 10 to 12 illustrate results of estimating the road surface by using the three methods in various situations, respectively. In FIGS. 10 to 12, FIGS. 10A, 11A, and 12A illustrate a left stereo image and the dense disparity map, FIGS. 10B, 11B, and 12B illustrate the ground truth of the manually input road profile, and FIGS. 10C, 11C, and 12C illustrate results of the estimation of the road profile by the three methods. Yellow lines of FIGS. 10B, 11B, and 12B mean the ground truth of the road profile, and green lines, blue lines, and yellow lines of FIGS. 10C, 11C, and 12C mean the results of estimating the road surface by method A, method B, and the suggested method, respectively. FIGS. 10A to 10C illustrate the result of estimating the road profile in the situation included in the KITTI DB. It can be seen that when there is little obstacle in a front side, a wide road surface exists, and the stereo-matching is properly performed as described above, all of the three methods successfully estimate the road surface. FIGS. 11A to 11C illustrate the result of estimating the road profile in the situation included in the DAIMLER DB. It can be seen that in the situation where the region of the road surface is less viewed due to an adjacent obstacle as described above, the suggested method and method B show the stable result, but method A fails to estimate the road surface. This is a result corresponding to the contents of the analysis of FIG. 8. FIGS. 12A to 12C illustrate the result of estimating the road profile in the situation included in the 6D-Vision DB. It can be seen that in the situation where as a distance is increased, the region of the road surface is sharply decreased due to a building, a vehicle, and the like, the existing two methods start to unstably estimate the road surface from about a point of 50 m, but the suggested method properly estimates the road surface. This is a result corresponding to the contents of the analysis of FIG. 9.

C: Execution Speed

A speed of the suggested method was measured by 3.40-GHz Intel Core i7-2600 CPU (4-G RAM). The suggested method shows a speed of 38 ms in the DAIMLER DB, and a speed of 42 ms in the 6D-Vision DB and the KITTI DB. It can be seen that even though a size of the image of the 6D-Vision DB and the KITTI DB is about two times larger than that of the DAIMLER DB, the execution speed is increased only by 4 ms. The reason is that when the suggested method is used, after the 3D points are accumulated on the YZ-plane, a performance time is almost equally consumed regardless of a size of an image. This is one of the advantages of the method of accumulating the 3D points on the YZ-plane.

The exemplary embodiments of the device for protecting a passenger of the vehicle according to the present invention have been described above in detail with reference to the accompanying drawings. However, the exemplary embodiment of the present invention is not limited by the aforementioned exemplary embodiments, and may be variously modified and implemented within the equivalent scope by those skilled in the art. Accordingly, the scope of the present invention shall be defined by the accompanying claims.

What is claimed is:

1. An apparatus for assisting driving, comprising:
a stereo camera module mounted in a vehicle, and configured to obtain a first image through a first camera and a second image through a second camera; and
a processor configured to stereo-match the first image and the second image to obtain a dense disparity map, estimate a cubic b-spline curved line from the dense disparity map by using a coarse-to-fine method, and perform a road profile for two-dimensionally converting a 3D road, on which the vehicle travels, by using the cubic b-spline curved line,
wherein the processor includes:
a stereo-matching unit configured to stereo-match the first image and the second image to obtain the dense disparity map; and
a road surface estimating unit configured to estimate the cubic b-spline curved line from the dense disparity map by using the coarse-to-fine method,
wherein the road surface estimating unit includes:
a pixel processing unit configured to three-dimensionally restore all of the pixels of the dense disparity map, and accumulate the three-dimensionally restored pixels on an YZ plane;
a piece-wise linear function estimating unit configured to estimate a piece-wise linear function from a result of the accumulation; and
a cubic b-spline curved line estimating unit configured to estimate a cubic b-spline curved line based on the estimated piece-wise linear function.

2. The apparatus of claim 1, wherein the piece-wise linear function estimating unit includes:
a Hough Transform applying unit configured to apply Hough Transform to the 3D points existing in the result of the accumulation to obtain a voting result; and
a dynamic programming performing unit configured to set the voting result as a data term, set a connection relationship between straight lines of each section and a change in an inclination of the straight lines of each section as a smoothness term, and perform dynamic programming to estimate the piece-wise linear function.

3. The apparatus of claim 1, wherein the piece-wise linear function estimating unit estimates the piece-wise linear function by Equation 2:

$$Y = \tan(\theta_n) \cdot Z + p_n, Z_{n-1} \le Z < Z_n \qquad \text{[Equation 2]}$$

where $Z_{n-1}$ to $Z_n$ means an $n^{th}$ section, and $\theta_n$ and $p_n$ mean an angle of a straight line existing in the $n^{th}$ section and a segment of a Y axis, respectively, and in this case, $p_n$ is calculated based on a position at which each straight line starts.

4. The apparatus of claim 1, wherein the pixel processing unit divides the pixels, which are accumulated on the YZ-plane, for each predetermined section of a distance of a road included in the dense disparity map.

5. The apparatus of claim 1, further comprising:
a display unit configured to display an image received by the processor.

6. The apparatus of claim 5, wherein the display unit is a cluster or a head up display (HUD) on a front surface inside the vehicle.

7. The apparatus of claim 1, further comprising:
an input unit configured to receive a user input through a plurality of buttons or a touch screen.

8. The apparatus of claim 1, further comprising:
a memory configured to store a program for processing or control by the processor.

9. A vehicle comprising the apparatus for assisting driving of claim 1.

10. A method of operating an apparatus for assisting driving for a vehicle including a stereo camera module, which obtains a first image through a first camera and a second image through a second camera, the method comprising:
stereo-matching the first image and the second image to obtain a dense disparity map;
estimating a cubic b-spline curved line from the dense disparity map by using a coarse-to-fine method; and performing a road profile for two-dimensionally converting a 3D road, on which the vehicle travels, by using the cubic b-spline curved line,
wherein the estimating includes:
three-dimensionally restoring all of the pixels of the dense disparity map;
accumulating the three-dimensionally restored pixels on an YZ plane;
estimating a piece-wise linear function from a result of the accumulation; and
estimating a cubic b-spline curved line based on the estimated piece-wise linear function.

11. The method of claim 10, wherein the estimating of the piece-wise linear function includes:
applying Hough Transform to the 3D points existing in the result of the accumulation to obtain a voting result; and
setting the voting result as a data term, setting a connection relationship between straight lines of each section and a change in an inclination of the straight lines of each section as a smoothness term, and performing dynamic programming to estimate the piece-wise linear function.

12. The method of claim 10, wherein the estimating includes estimating the piece-wise linear function by Equation 2:

$$Y = \tan(\theta_n) \cdot Z + \rho_n, Z_{n-1} \leq Z < Z_n \quad \text{[Equation 2]}$$

where $Z_{n-1}$ to $Z_n$ means an $n^{th}$ section, and $\theta_n$ and $p_n$ mean an angle of a straight line existing in the $n^{th}$ section and a segment of a Y axis, respectively, and in this case, $p_n$ is calculated based on a position at which each straight line starts.

13. The method of claim 10, further comprising:
dividing the pixels, which are accumulated on the YZ-plane, for each predetermined section of a distance of a road included in the dense disparity map.

14. The method of claim 10, further comprising:
displaying an image on which the road profile is performed.

* * * * *